US011416290B2

(12) United States Patent
Sim et al.

(10) Patent No.: US 11,416,290 B2
(45) Date of Patent: Aug. 16, 2022

(54) SEMI-AUTONOMOUS INTELLIGENT TASK HUB

(71) Applicant: Microsoft Technology Licensing, LLC, Redmond, WA (US)

(72) Inventors: Robert Alexander Sim, Bellevue, WA (US); Ryen William White, Woodinville, WA (US); Omar Shaya, London (GB); Bernd Ingo Plontsch, Berlin (DE); Elnaz Nouri, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 16/886,764

(22) Filed: May 28, 2020

(65) Prior Publication Data

US 2021/0373943 A1 Dec. 2, 2021

(51) Int. Cl.
*G06F 9/48* (2006.01)
*G06F 9/54* (2006.01)
*G06N 3/04* (2006.01)

(52) U.S. Cl.
CPC ............ *G06F 9/4881* (2013.01); *G06F 9/485* (2013.01); *G06F 9/542* (2013.01); *G06N 3/0454* (2013.01)

(58) Field of Classification Search
CPC .................................................. G06F 9/4881
See application file for complete search history.

(56) References Cited

U.S. PATENT DOCUMENTS

| | | | |
|---|---|---|---|
| 9,318,108 B2 | 4/2016 | Gruber et al. | |
| 9,384,043 B2 | 7/2016 | Howard | |
| 2011/0321051 A1 | 12/2011 | Rastogi | |
| 2014/0129611 A1* | 5/2014 | Norris ..................... | G06F 9/545 |
| | | | 709/202 |
| 2016/0267194 A1 | 9/2016 | White et al. | |
| 2017/0206217 A1* | 7/2017 | Deshpande ......... | G06F 3/04847 |
| 2018/0006977 A1 | 1/2018 | Nandi et al. | |
| 2019/0012198 A1 | 1/2019 | Ni et al. | |
| 2019/0213490 A1 | 7/2019 | White et al. | |
| 2019/0220438 A1 | 7/2019 | Pal et al. | |
| 2019/0228766 A1 | 7/2019 | White et al. | |
| 2019/0324795 A1 | 10/2019 | Gao et al. | |

OTHER PUBLICATIONS

Gao, et al., "Neural Approaches to Conversational AI", In Proceedings of the 56th Annual Meeting of the Association for Computational Linguistics-Tutorial Abstracts, Jul. 15, 2018, pp. 2-7.

(Continued)

*Primary Examiner* — Charlie Sun

(57) ABSTRACT

The present disclosure relates to systems and methods for an interactive, intelligent hub built around the completion of a task. This hub brings together resources, information, suggested steps, and other automated assistance to facilitate the completion of the task. AI-based assistance may indicate which steps can be completed by automated processes, and dispatch those processes, or suggest resources to assist in the completion of other steps. The hub displays the current status of the task, and lives until the completion of the task, or abandonment by the user.

20 Claims, 9 Drawing Sheets

(56) References Cited

OTHER PUBLICATIONS

Jiang, et al. , "A General Planning-Based Framework for Goal-Driven Conversation Assistant", In Proceedings of the 33rd AAAI Conference on Artificial Intelligence, Jul. 17, 2019, pp. 9857-9858.
"International Search Report and Written Opinion Issued in PCT Application No. PCT/US21/027576", dated Jul. 2, 2021, 14 Pages.
Peng, et al., "Composite Task-Completion Dialogue System via Hierarchical Deep Reinforcement Learning", In Repository of arXiv:1704.03084v1, Apr. 10, 2017, 13 Pages.
Williams, et al., "End-to-End LSTM-Based Dialog Control Optimized with Supervised and Reinforcement Learning", in Repository of arXiv:1606.01269v1, Jun. 3, 2016, 10 Pages.
Sun, et al., "Contextual Intent Tracking for Personal Assistants", In Proceedings of the 22nd ACM SIGKDD International Conference on Knowledge Discovery and Data Mining, Aug. 13, 2016, 10 Pages.

* cited by examiner

SEMI-AUTONOMOUS INTELLIGENT TASK HUB

BACKGROUND

Users can benefit from time-savings when they have automated assistance at managing and completing their tasks, especially relatively complex tasks. It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues may be resolved by an interactive, intelligent hub built around the completion of a task. This hub brings together resources, information, suggested steps, and other automated assistance to facilitate the completion of the task. The AI-based assistance may indicate which steps can be completed by automated processes and suggest resources to assist in the completion of other steps. The hub displays the current status of the task, and lives until the completion of the task, or abandonment by the user.

Systems and methods for semi-autonomously managing a task comprise determining that the task comprises a plurality of subtasks including a first subtask and a second subtask and determining by a neural network that the first subtask is automatable based at least on a state of the plurality of subtasks and a definition for the first subtask. This determination may also be made based on other factors including dependencies between tasks and subtasks, whether there are any empty slots in the task definition, and whether a subtask delegation has been fulfilled. The first subtask is automatically performed based on the determination that the first subtask is automatable. The system and the methods may also determine by the neural network that the second subtask requires user input based on the state of the plurality of subtasks and a definition for the second subtask. If so, the user is notified user input is needed to complete the second subtask.

Further, the systems and methods may determine the order of completion for the subtasks based on number of factors including dependencies between tasks and subtasks, subtask definitions, the state of each subtask, and missing information from the subtask definitions. The user of the terms first and second are not meant to imply order as automatable subtasks and tasks may be completed in any order that is determined by the neural network. In aspects, tasks and subtasks may be delegated to third parties based on information received from a user, information received from other resources such as previously performed tasks, dependencies between tasks and subtasks, subtask definitions, the state of each subtask, and missing information from the subtask definitions.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific example aspects. However, different aspects of the disclosure may be implemented in many different forms and should not be construed as limited in the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure relates to systems and methods for an interactive, intelligent hub built around the completion of a task. This hub brings together resources, information, suggested steps, and other automated assistance to facilitate the completion of the task. AI-based assistance may indicate which steps can be completed by automated processes, and dispatch those processes, or suggest resources to assist in the completion of other steps. The hub displays the current status of the task, and lives until the completion of the task, or abandonment by the user.

In aspects, an intelligent task hub acts as a central clearing house for planning, defining and managing tasks and their sub-tasks, gathering necessary resources, tracking task progress, and viewing all of these aspects. A task managed by the task hub may have links to other tasks it is dependent on, possibly managed by other users' task hubs, or that depend on it. Further, in aspects the task hub is directly addressable as a web service and it facilitates direct access to task resources, sharing the tasks and their details with other users who may interact with this autonomous agent through the web service. The task hub is aware of task status and manages subtasks to task completion.

Figure 1:
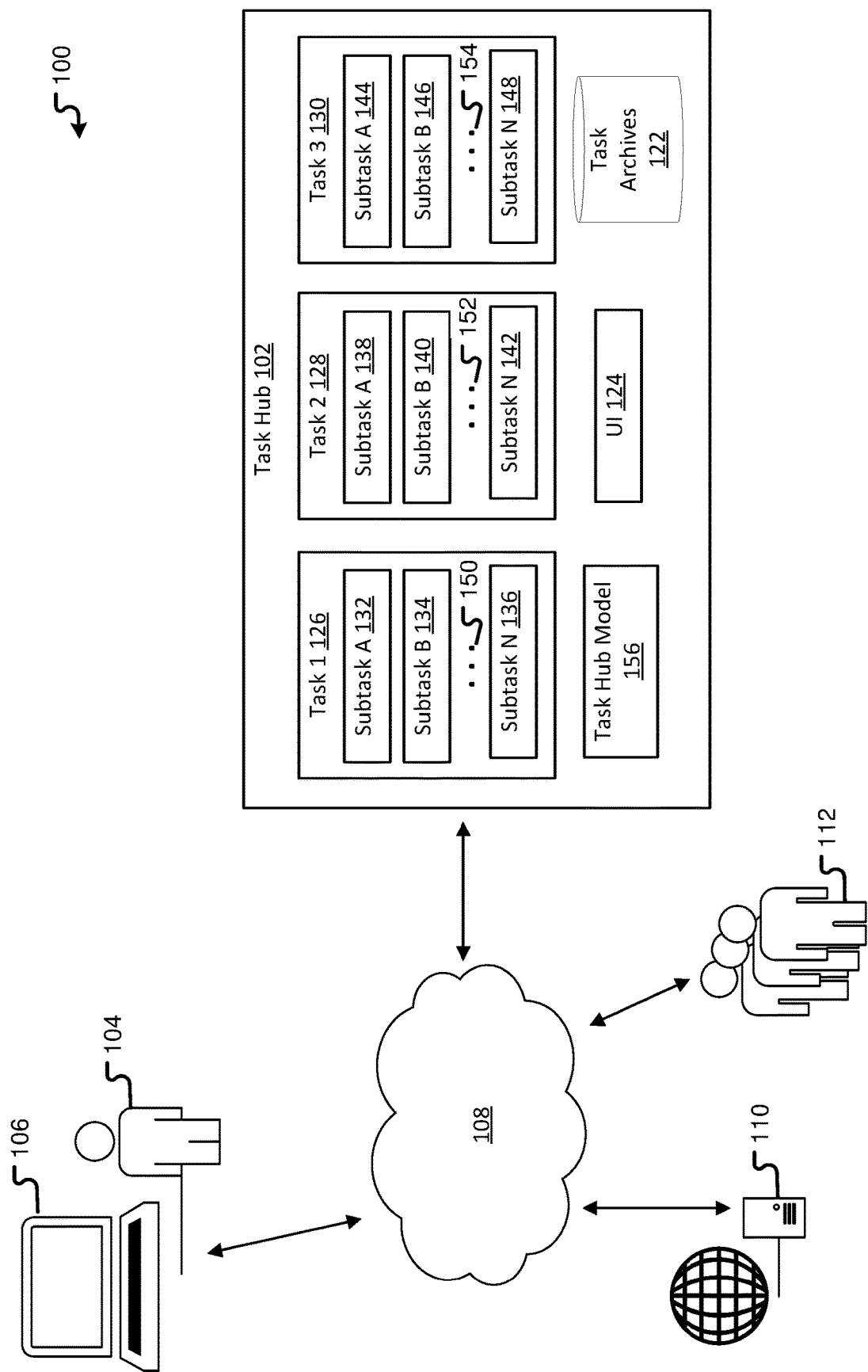
FIG. 1 illustrates an overview of an example system for a semi-autonomous task management system in accordance to aspects of the present disclosure.

FIG. 1 illustrates an overview of an example system 100 for a semi-autonomous task management in accordance with aspects of the present disclosure. System 100 includes task hub 102, which may reside on a server or as part of a web service. The task hub 102 is connected to a user device 106 of a user 104 via a network 108. The user device 106 may be any type of computing device including one or more of: a mobile telephone; a smart phone; a tablet; a smart watch; a wearable computer; a personal computer; a desktop computer; a laptop computer; a gaming console 10 (e.g., Xbox®); a television; a smart speaker; and the like. This list is exemplary only and should not be considered as limiting as one of skill in the art will appreciate that many different types of devices may be employed as part of system 100. The user device is equipped with applications including productivity applications such as e-mail, calendar, contacts, and personal assistant applications, collaboration applications, a web browser, and the like. This list is exemplary and should not be considered limiting. The network 108 may be any kind of network including without limitation the Internet, a local area network (LAN) or a wide area network (WAN). The user device 106 and the task hub 102 are also connected to web server 110 and other users 112 via network 108.

The task hub 102 has a task agent for each active task it is managing, which in system 100 includes an agent for Task 1 126, an agent for Task 2 128, and an agent for Task 3 130. Alternatively, a single agent could be used for multiple tasks. Task 1 126 is comprised of several subtasks including subtask A 132, subtask B 134, and subtask N 136. Although three subtasks are shown, a task may include any number of subtasks as illustrated by ellipses 150. Task 2 128 comprises several subtasks including subtask A 138, subtask B 140, and subtask N 142. Although three subtasks are shown, a task may include any number of subtasks as illustrated by ellipses 152. Task 3 130 comprises several subtasks including subtask A 144, subtask B 146, and subtask N 148. Although three subtasks are shown, a task may include any number of subtasks as illustrated by ellipses 154. In aspects, a subtask may itself include any number of subtasks or sub-actions (not shown). The task agent responsible for managing or orchestrating subtasks of an active task may in turn call subtask agents responsible for completing aspects of subtasks. The subtask agents may be short-lived (e.g., to dispatch a notification), or remain instantiated until some action is taken or requirement is satisfied.

At the outset, task hub 102 may be responsible for identifying subtasks that will be part of a task. Alternatively, the subtasks may be predefined as part of the task. In further aspects, the user may identify some or all of the subtasks. In other aspects, the hub 102 may gather information about what subtasks should be part of the task from various places including, for example, the task archives 122 or resources such as the Internet 108. For example, if the task is to plan a wedding reception, the hub 102 may conduct an Internet search to determine that this task involves various subtasks such as finding a venue, ordering flowers, ordering a cake, and hiring a photographer. In this example, the user may add subtasks as well, such as to send invitations to all friends and family. In this case, the user's contacts might also be a resource for the task hub to identify which contacts to send invitations to. In this example, the task hub may request that the user confirm the guest list created by the task agent before the subtask is considered complete. The task hub 102 may provide recommendations to the user 104 depending on the content of the task, user status, user feedback and personalized needs for information. For example, based on the search results, the task hub 102 may recommend to the user 104 to add a subtask of hiring a band.

In the planning aspects, the task hub 102 may provide a recommendation at every step of the interaction with the user 104 based on selection of the type of the recommendation and generation of the content of recommendation. In an example, a task hub model 156 uses a current definition of the step of the task, prior tasks, and/or future steps in the current task as context for determining the type of the recommendation that is to be provided as discussed in more detail with reference to FIG. 2. This model may be a seq2seq model that is paired with variational autoencoder for classification using a neural network such as, for example, a Bidirectional RNN. The task hub 102 may provide recommendations to the user depending on the content of the task, user status, user feedback and personalized needs for information. The task hub 102 may take into account a user's preferences for modality of the assistance/recommendations and an account of user's preferences for receiving certain types of assistance/recommendations. The task hub 102 may provide selection of an action to take in support of the user (e.g., provide clarification, search web, show video, etc.) and selection a device(s) to support task completion. Considerations for task assistance include: the type of the task, user preferences, available devices and resources, and potential automatic breakdown of the task into steps.

In resource gathering aspects, the task hub 102 accrues resources needed for planning and defining and managing sub tasks. User 104 may assign resources such as web links, documents, contact information, and other digital resources that can assist with completing the task or subtask. The task hub 102 may also suggest or collect this information regarding known steps in the task completion to assist the user. The task hub 102 may provide resources, documentation, assistance or suggestions that are relevant to the task. In some cases the user 104 may specify all of the resources needed to enable the agents of task 1 126, task 2 128, and task 3 130 to complete the tasks entirely autonomously. For instance, trip planning might involve automatically booking a flight, car and hotel given user specified constraints. The task hub 102 may publish a list of community tasks and/or act as a mediator to connect skilled users with tasks they can help complete. The task hub 102 may provide collection of relevant online search results that are related to the task online.

The agents of the task hub 102 are able to determine what has been done, what information is available, and determine what tasks can be done automatically on behalf of a user 104. Similarly, the task hub 102 may determine what tasks require more information or resources from the user or other sources. For instance, the task hub 102 may automatically renew a license, or order materials online. Users may choose to delegate the task by assigning the task hub 102 step to another user such as users 112 (i.e., delegates).

In aspects, the task hub 102 is directly addressable as a web service to facilitate direct access to task resources, share the task and its details with other users, and interact with as an semi-autonomous agent (e.g., as a bot, or as a smart-speaker skill). The task hub 102 also provides managed views of the task to users with different assigned roles in the task (task owner, step executor, observer, etc.) through UI 124, which is provided for display at user device 106. On task completion or abandonment, the task hub 102 and its accrued resources may be automatically saved/archived in the task archives 122 for future instantiations of the same or similar task.

Figure 2:
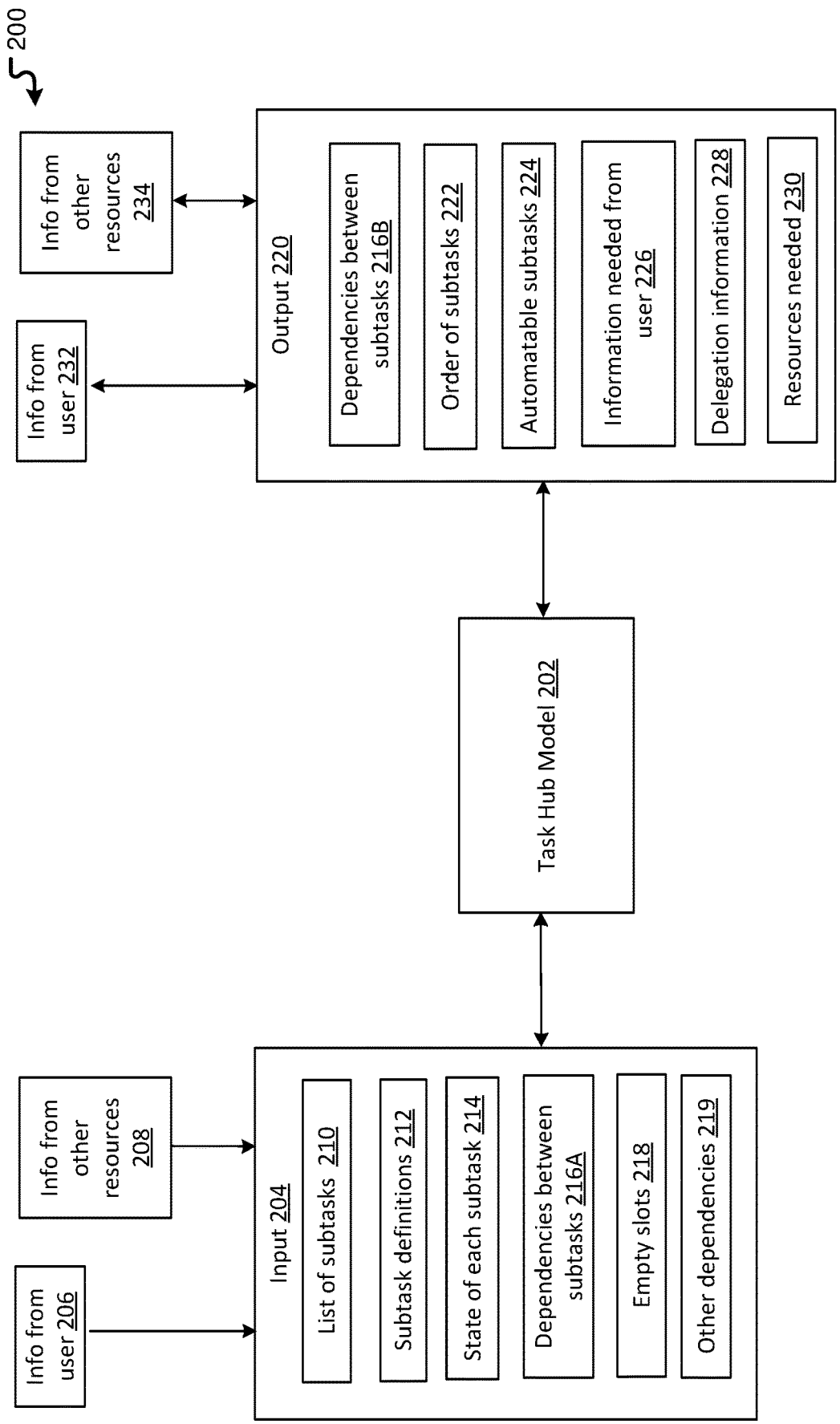
FIG. 2 illustrates a semi-autonomous system for task management in accordance to aspects of the present disclosure.

FIG. 2 illustrates an example semi-autonomous system for task management in accordance with aspects of the present disclosure. Task hub model 202, such as task hub model 156 in FIG. 1, is shown as part of system 200. In aspects, the task hub model is a machine learning model, such as neural network and may be a recurrent neural network, a convolutional neural network, a transformer network machine learning model, and/or a multi-task neural network. Information from the user 206 is fed into the input 204. In aspects, the user may provide information 206 regarding the task. In other aspects, the user may provide information 206 regarding some or all of the subtasks and may even provide detail regarding some of sub-actions of the subtasks. Information 206 might come directly from the user, such as user 104 in FIG. 1, or from the user's information, such as his or her accounts (e.g., contacts, calendar, e-mail). Information 208 from other resources, such as task archives or Internet searches or training data, may also be fed into the input 204.

From information 206 and information 208, input 204 is determined. Input 204 includes, without limitation, a list of subtasks 210, subtask definitions 212, the state of each subtask (e.g., not started, in progress, complete), dependencies between subtasks 216A, empty slots 218, and other dependencies 219. The list of subtasks 210 includes each action that needs to be taken to complete the task. For example, if the task is to book a business trip, subtasks might include book airfare, book hotel, book transportation at destination, and schedule meeting. If the task is to schedule a wedding reception, the subtasks might be choose a date, book a venue, book a caterer, order flowers, order cake, and book a photographer. The list of subtasks may come from the user information 206 or other resources 208. The subtask definitions 212 include the details about each subtask, including who, what, where, when, and how. In the business trip example, the subtask definition for book airfare might include the user's preferred airline, frequent flyer number, destination, outbound and return dates, and login information for airline website. The subtask definitions might come from the user information 206 or other information 208, such as task archives. As another example, the subtask definitions for book venue might include the wedding date and time, number of people, length of event, and general desired location. The state of each subtask 214 indicates how much of the subtask has been completed. For example, states may include not started, need information, in progress, waiting on response, or complete. While these are examples of various subtask states, they should not be considered limiting. In aspects, subtasks may be broken down in to sub-actions and that the state may indicate the progress made on each sub-action. There may be dependencies between subtasks 216A as part of input 204 that come from either the user information 206 or other information 208. In aspects, subtasks with dependencies may not be completed until the dependencies are satisfied. In the business trip example, the task hub may not be able to book airfare until the business meeting date is set, therefore satisfying the dependency. The task archives (e.g. information from other sources 208) may provide this dependency because it was part of performing an earlier similar task. In the wedding reception example, a date might not be able to be selected until it is confirmed that a preferred venue is available. In examples, this dependency may be inputted directly from the user by specifying the preferred venue. The empty slots 218 comprise all of the information from subtask definitions 212 that are missing—that is, the information that was not fed into the input 204 from the information 206 and 208. In the business trip example, the date or location of the business meeting may be missing information that is needed. In the second example, the general location (city, state) might be needed for the wedding reception task. The other dependencies 219 include dependencies on other tasks or other user's task hubs. For example, another task might be to book a wedding and the book the wedding reception task may be dependent on the wedding task. In aspects, if a subtask is delegated to another user, that user may have the subtask as part of his or her task hub, which adds a dependency between two users' task hubs.

The input 204 is inputted into the task hub model 202 to create output 220 by translating a task state description (e.g., input 204) into a variety of useful outputs (e.g. output 220). Output 220 comprises dependencies 216B, order of subtasks 222, the identity of subtasks that are automatable 224, information needed from the user 226, delegation information 228, and resources needed 230.

In some cases, the model generates the subtask dependencies 216B in addition to the subtask dependencies that come from input 204. For example, in a recipe task, a subtask might indicate "mix wet ingredients with the dry mixture." The task hub model 202 will infer what is meant by these two things and what previous recipe steps (subtasks) provide them. In other cases, dependencies might be made explicit by the subtask—if there are empty slots the agent might instantiate a subtask to fill the slots, such as determining the business meeting date. The order of subtasks 222 provides the task agent in the task hub with the order that each subtask should be performed according to the input 204 that was fed into the task hub model 202. To determine the order of subtasks 222, the model first identifies any explicit dependencies between subtasks 216A and 216B. Then, the model may choose to rank tasks for execution based on a) availability of resources to complete them; b) any needed lead time (e.g., need to book a caterer several months in advance, need to pick up flowers no more than 48 hours in advance); and c) by grouping by proximity/relevance—some subtasks might be performed together at the same location or in a single online order, etc.

The automatable subtasks 224 is a list of the subtasks that may be automated, namely performed by the task hub without the help or any action by the user or other human being. For example, if it has the necessary subtask definitions, the task hub agent may book airfare for the user without any user intervention. The model is trained as to which tasks are automatable using a machine-teaching approach. Initially, subtasks that can be automated may be completed by humans, which produces a training set for the machine to learn to imitate user actions or a standard for performing the subtasks. A task hub model 202 is trained to enable the task hub to recognize tasks that it is capable of performing, and tasks for which it still needs human assistance. The task hub model 202 also outputs information it still needs from the user 226 to complete the subtasks that are not complete according to the subtask state 214. "Information" represents concrete units of information the agent needs to execute a plan of action. Subtasks may be explicitly defined as having slots that need to be filled, in which case the system will not trigger execution of the subtask until this information is available. Subtasks may also be defined by learning from online sources (such as how-to guides). In this case the model learns to make connections between subtasks and understand what it needs to complete any given subtask as in the case of the recipe example. This kind of implicit slot filling can be modeled using training data. As discussed in more detail in connection with FIG. 3, the task hub may ask for and receive the information 232 from the user. The task hub may also retrieve information it needs from other resources 234, such as the task archives and/or the Internet. Some of the retrieved information may be used to fill empty slots 218 and/or update subtask definitions 212.

The task hub model 202 outputs delegation information 228, which comprises information that should be delegated to other users. In the explicit case, the subtask is associated with a third-party user. This may occur as part of the subtask definitions 212 or after a sub-action has been taken in furtherance of a subtask. For example, after a caterer is booked then caterer-related subtasks might be delegated directly to the caterer. In the more implicit examples, the model is made aware of services that users can provide as part of the input 204, information from user 206, or information from other resources 208. For example, in an organization a document may need notarizing or a check signed and the system has a list of users that that kind of task could be delegated to, which is fed in as part of information from other resources 208.

Resources needed 230 comprises those resources that the task hub needs but does not have. Resources comprise information or sources of information relevant to a subtask. Resources empower the agent to make decisions on behalf of the user, whereas information represents concrete units of information the agent needs to execute a plan of action. For example, resources might comprise a list of preferred caterers, whereas to execute a subtask with a single caterer the task hub model 202 might need more specific slot information such as menu choice and credit card number.

The task hub model 202 may be bidirectional meaning that it can reason forwards from the current state, and backwards from the goal state to choose the best plan of action and identify necessary inputs and resources from the user.

The task hub model 202 is trained by assembling training data from multiple sources, such as task descriptions collected from the internet, subtask sequences and open slots annotated by human judges, and demonstration data collected from humans executing subtasks. The training data is staged to define input task states based on the training data, and the corresponding desired outputs. The model is then trained on the training data, using multi-task learning to enable improved performance across the variety of outputs the model generates.

Figure 3:
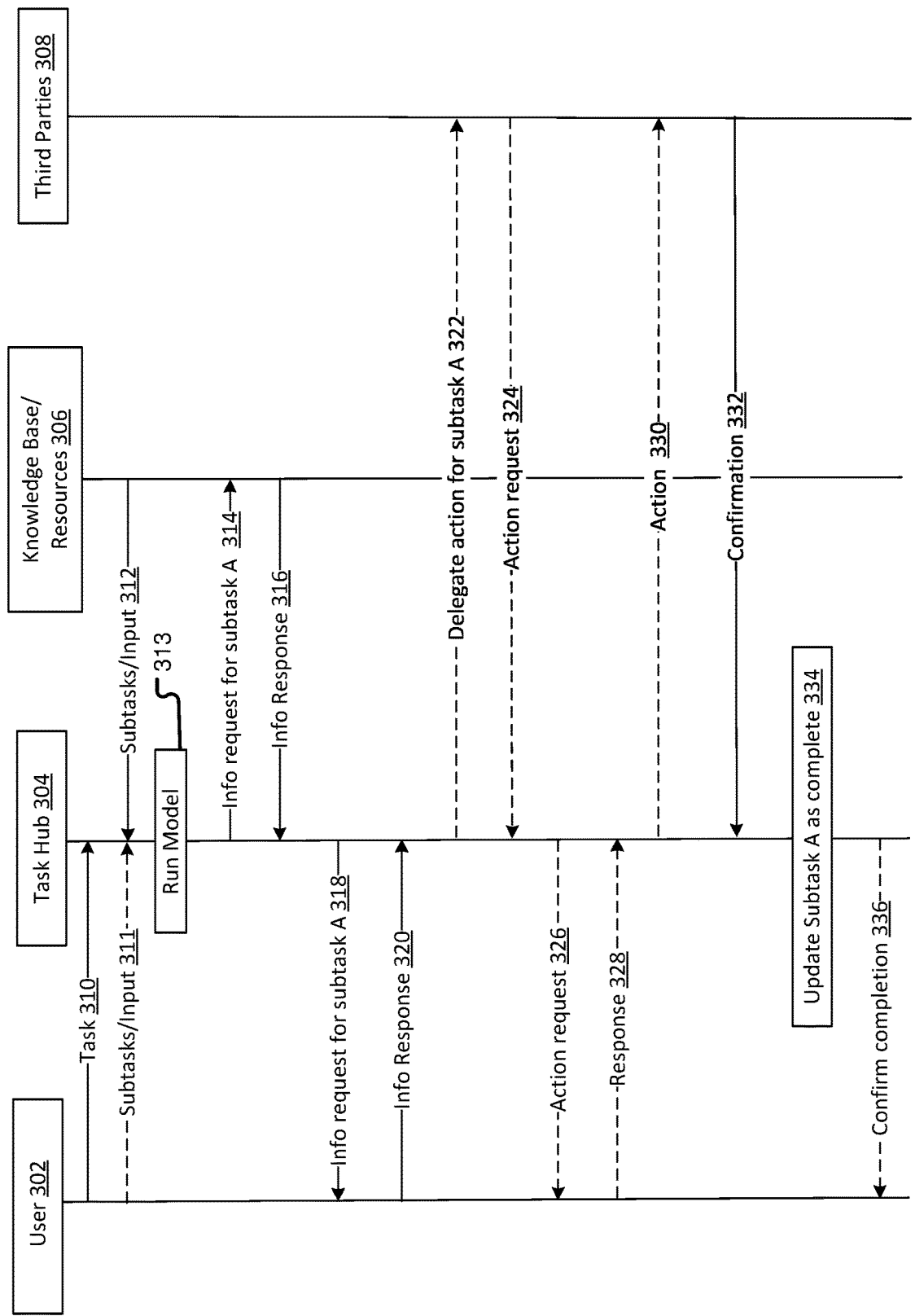
FIG. 3 is a communication flow illustrating a method of semi-autonomously managing a subtask in accordance with aspects of the present disclosure.

FIG. 3 is a communication flow illustrating a method of semi-autonomously managing a subtask in accordance with aspects of the present disclosure. User 302 sends a task 310 to task hub 304, such as "take a business trip" or "plan a wedding reception." In aspects, the user may send this task through a semi-autonomous task application on a user device or directly to the task hub web service through the user device. The task hub 304 uses the task 310 to determine what subtasks and other input 312 (such as input 204 in FIG. 2) are needed for task 310. In aspects, the tasks/input 312 is received from the knowledge base/resources 306. The knowledge base/resources 306 may include any source of information available to the task hub 304, including without limitation, the task archives, the Internet, the task hub model, user resources, such as user accounts, and user preferences. In other aspects, the user 302 may send some or all of the subtasks and other input 311 to the task hub 304.

The input is run through the task hub model 313 as described in connection with FIG. 2 to determine output, such as output 220 in FIG. 2. From the output, the task hub 304 determines that information is needed for the first subtask A and determines it can obtain this information from the knowledge base/resources 306. For example, as described in connection with FIG. 2, the system may determine it can find the information it needs from online resources. The model is trained to determine the best way to fill a slot for a subtask, which in this example is to issue an information request 314 to the knowledge base 306. Thus task hub 304 issues a request 314 to the knowledge base/resources 306 for the needed information. In the first example of booking the business trip, the task hub may 304 may need the user's login credentials for the user's airline of choice. The task hub 304 may get the login credentials from the task archives from a prior task that involved booking airline tickets. In the wedding reception example, the task hub 304 may perform an Internet search to find the most popular types of flowers for a wedding during time of year the wedding reception is scheduled. In either case, the information response 316 is returned to the task hub 304. In aspects the returned information is added to the model input as shown in FIG. 2 and the output is updated (not shown).

In aspects, the task hub 304 may need information from the user 302 to complete the subtask A. The task hub 304 issues an information request 318 to the user 302 to complete subtask A. In examples, the task hub may issue the request by sending a message to the user. Alternatively or additionally, the task hub 304 may flag the missing information so that the user sees it when the user accesses the task hub 304. The task hub 304 may already have known about this information needed from the task hub model 313 output. Additionally or alternatively, the task hub 304 might have determined it needed this information to automate the task from the information it received in information response 316. For example, the task hub 304 might have known it needed the departure and return dates for the airfare from the user 302 and send an information request 318 to the user for this information. The user provides this information 320 to the task hub 304. In the wedding reception example, the task hub 304 may receive as information response 316 a list of popular flowers for a wedding reception in April (e.g., tulips, peonies, freesia) and at that point determine it needs to ask the user which flowers he or she would like. In this case, the task hub 304 will send an information request 318 to the user 302 asking the user to choose the type of flower and the user will issue a response 320 to the task hub 304 with his or her choice.

After receiving user response 320, the task hub 304 may automatically perform the subtask (not shown). For example, the task hub 304 may automatically purchase the airline tickets from the airline website based on the subtasks/input 311, subtasks/input 312, the info response 316, and/or the info response 320. Or the task hub may automatically place an order for the type of flower selected by the user in the user response 320 from a vendor.

Alternatively, performance of the task may involve delegation 322 of an action or an entire subtask to one or more third parties 308. The third party 308 may be identified in a number of ways. The user may provide a list of preferred vendors. Alternatively, the user may specify something like "find me a local vendor". Communication with the vendor could be automated over a network (e.g., flight booking), or semi-automated (e.g., automating one side of an email conversation with the vendor). In some cases (dashed lines), the third party 308 requires user input or some additional action 324 from the user. If so, the third party may send an action request 324 to the task hub 304, which forwards the action request 326 to the user 302. The user responds 328 and the task hub 304 provides the requested action 330 to the third party 308. For example, the flower vendor may require the user to sign a contract. In this case, the flower vendor sends an action request 324 for a signature on a contract to the task hub 304 and the task hub 304 forwards the signature request 326 (e.g., a link to a signing service) to the user 302. The user 302 signs the contract and this is response 328 is forwarded through the task hub 304 to the third party 308 by action 330.

Regardless of whether additional action is required by the user 302 or not, the third party 308 sends confirmation 332 that the subtask is complete to the task hub 304. The task hub 304 then marks subtask A as complete 334. Optionally, the task hub 304 may send confirmation 336 to the user 302 that the subtask A is complete. The task hub may store the all information of the completed subtask in the task archives for later use (not shown).

Figure 4:
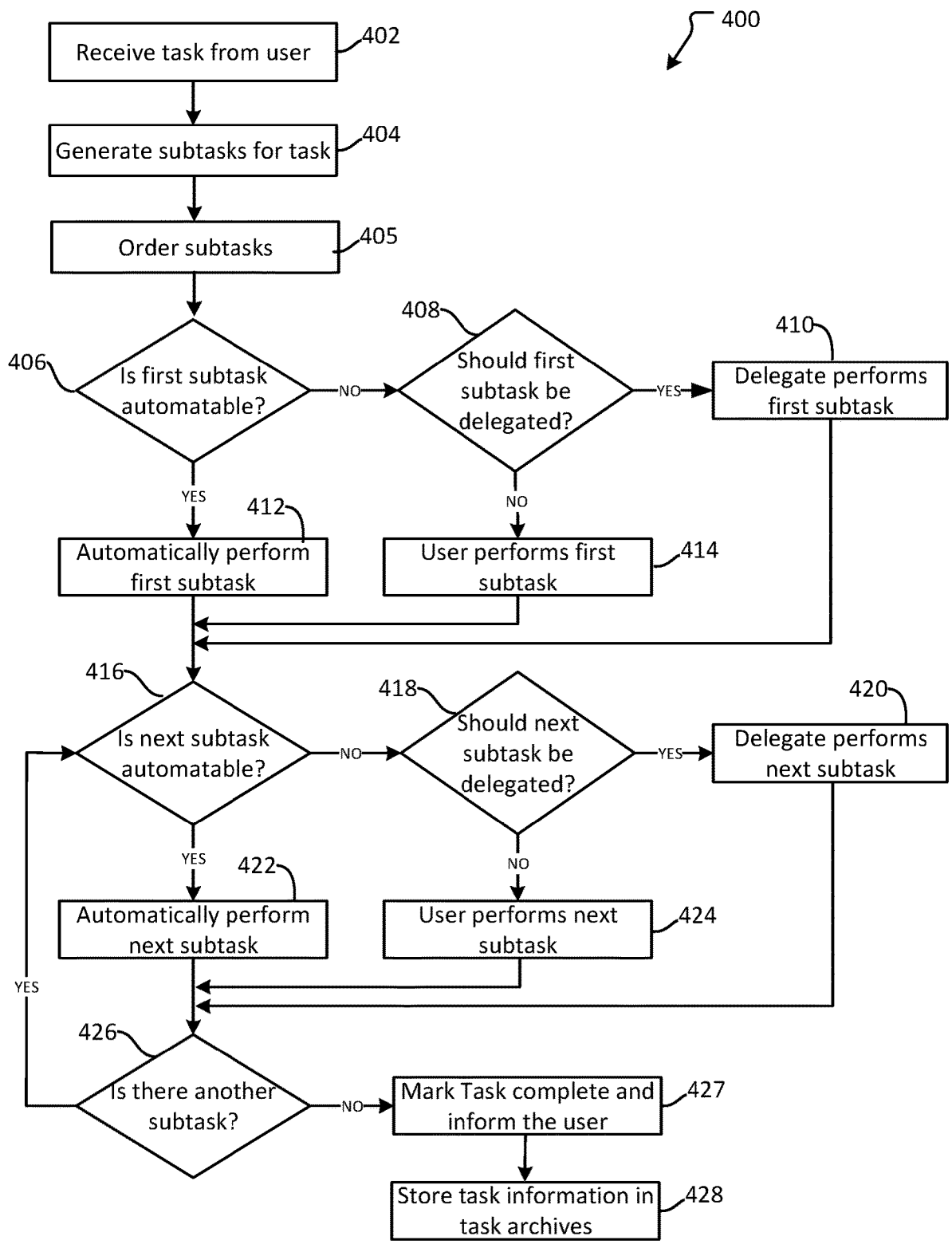
FIG. 4 illustrates an example method of semi-autonomously completing tasks in accordance with aspects of the present disclosure.

FIG. 4 illustrates an example method of semi-autonomously completing tasks in accordance with aspects of the present disclosure. A general order for the operations of the method 400 is shown in FIG. 4. Generally, the method 400 starts with a start operation 402 and ends with an end operation 428. The method 400 may include more or fewer steps or may arrange the order of the steps differently than those shown in FIG. 4. The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, component, devices, modules, software, data structures, data characteristic representations, signaling diagrams, methods, etc. described in conjunction with FIGS. 1-3 and 5-8B. The method 400 presumes that there is a task hub model that has been generated and trained.

At operation 402, the task hub receives a task from a user, a task application, a calendar application, or any other type of application capable of performing or assigning tasks. At operation 404, a list of subtasks is generated for the task as has been described herein with reference to FIGS. 2 and 3. At operation 405, the subtasks are placed in order that they should be completed based on the model as described in connection with FIG. 2. At decision 406, it is determined whether the first subtask is automatable—that it is capable of being performed automatically by the task hub without user intervention. In aspects, this determination is made using a machine learning. Initially, subtasks that can be automated may be completed by a user humans to produce a training set for a machine to learn to imitate perform user actions or preferences. A model is trained to enable the task hub to recognize tasks that it is capable of performing without human intervention, and tasks for which it still needs human assistance. If the determination is YES, method 400 moves to operation 412 where the first subtask is automatically performed by the task hub. If the decision 406 is NO, method 400 moves to decision 408 to determine whether the first subtask should be delegated to a third party, namely someone other than the user. In aspects, the determination that a subtask should be delegated to a third party may be part of the subtask definitions or other input that is input into the neural network. Additionally or alternatively, the determination that a subtask should be delegated to a third party is part of the output from the neural network as described with regard to FIG. 2. In other aspects, a model is trained to enable the task hub to recognize tasks that need to be delegated. If the determination is YES at decision 408, method 400 moves to operation 410 and the first subtask is performed by a delegate. If the determination is NO, the method moves to operation 414 where the user performs the first subtask.

At decision 416, it is determined whether the next subtask is automatable. If the determination is YES, method 400 moves to operation 422 where the next subtask is automatically performed by the task hub. If the decision 416 is NO, method 400 moves to decision 418 to determine whether the next subtask should be delegated to a third party. If the determination is YES at decision 418, method 400 moves to operation 420 and the next subtask is performed by a delegate. If the determination is NO, the method 400 moves to operation 424 where the user performs the next subtask.

At decision 426, a determination is made as to whether there is another subtask to be performed. If the answer is YES, the method proceeds back to decision 416. If the answer is NO, the task is marked complete and the user is informed the task is complete at operation 427 and the task information is stored in task archives at operation 428 for later use by the task hub.

Figure 5:
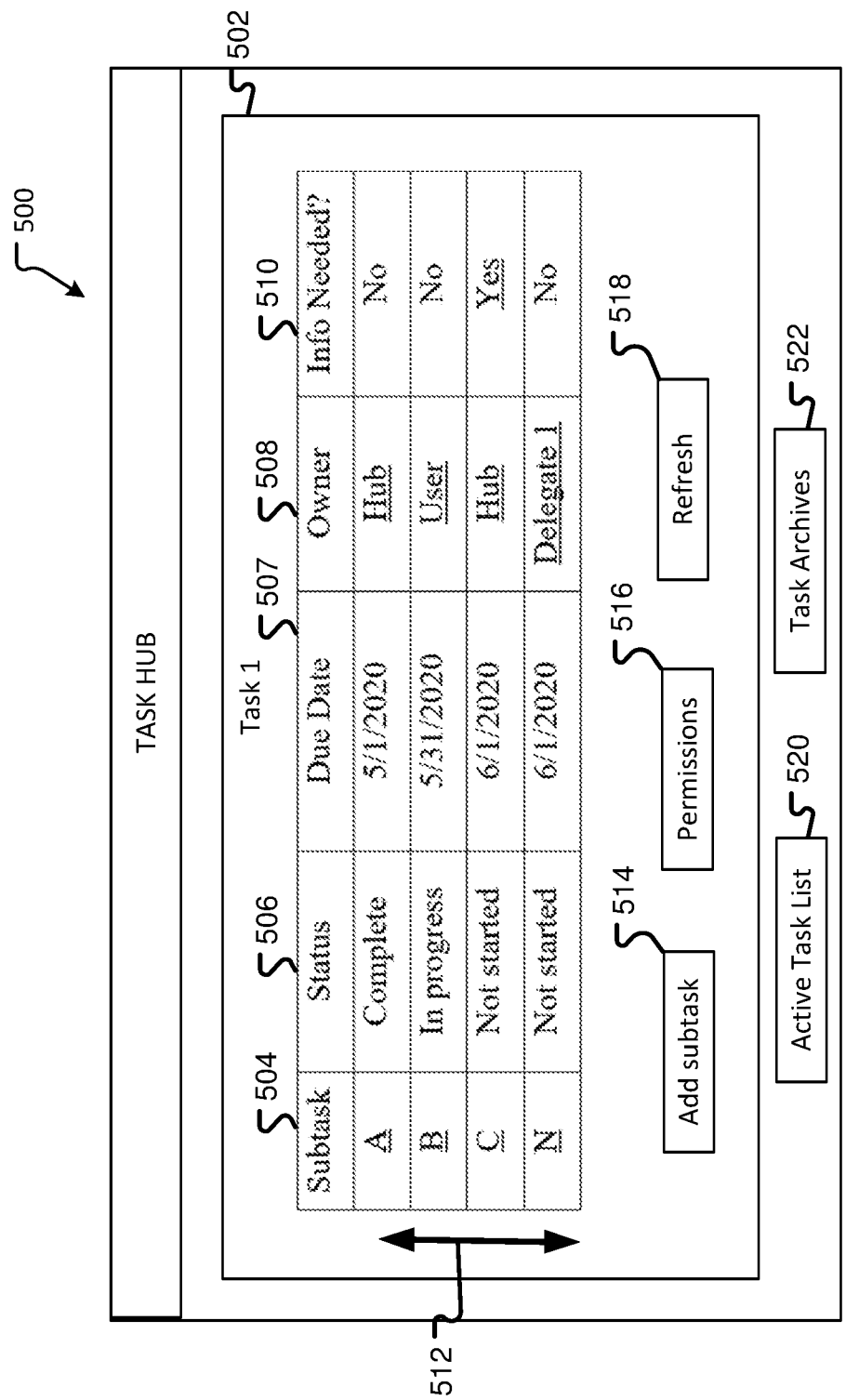
FIG. 5 illustrates a user interface for the task hub in accordance with aspects of the present disclosure.

FIG. 5 illustrates an example user interface 500 for the task hub in accordance with aspects of the present disclosure. Window or pane 502 relates to the first Task 1. Other tasks may be viewed by selecting UI control for the Active Task List 520. Completed or abandoned tasks may be viewed by selecting UI control 522 for Task Archives. The current task pane 502 contains a list of subtasks 504 that are part of the current task, the state or status 506 of each subtask, the due date or completion date of each subtask 507, the owner 508 of each subtask, and whether any information is needed 510 for each subtask. Scroll 512 allows users to see all of the subtasks that are part of the active task in pane 502. Information that is underlined is hyperlinked to additional detail. For example, clicking on the "A" in the subtask list 504 brings up further information about subtask A including without limitation the subtask definitions described in connection with FIG. 2. In aspects, the user may edit these definitions through this view (not shown). The status 506 provides the user with information regarding the state of the task. The owner 508 indicates who is responsible for completing the subtask. Subtasks A and B indicate that the "hub" is the owner of the subtask meaning that they will be performed automatically by the task hub without user intervention. In aspects, the hub determines the owner of each subtask but a user may change the owner of the subtask by selecting the underlined owner name for each subtask entry. The info needed 510 indicates whether the task hub needs information or resources to completed. For example, task B shows as in progress, that it is owned by the user (e.g., being performed by the user), and no information is needed to complete the task. In aspects the task hub keeps track of user actions to keep the state of the tasks up to date. For example, the user might keep the task hub informed as to status by copying the task hub on emails sent in performance of a subtask. Subtask C is not started, is owned by the hub meaning that the hub will perform it automatically, but that the hub needs information to complete this task. The user may select the "Yes" hyperlink to see what information is needed and to provide the necessary information so that the hub may complete the subtask. Subtask D has been assigned to Delegate 1 which may be any other user who has access to the task hub.

A user may add subtasks by selecting UI control 514. The user may also manage which users have what permissions to view various levels of detail of the user's task hub by selecting UI control 516. The user may re-run the inputs through the task hub model by selecting the refresh UI control 518. In aspects, the UI hub re-runs the inputs through the Task hub model any time any information is added or changed for any task.

The intelligent task hub provides many technical benefits. The system promotes interaction of disparate systems thereby automating task completion across disparate systems and data sources. Further, it increases user efficiency by automating some tasks that users previously needed to perform manually. It also increases user efficiency by keeping track of and managing the various states of subtasks in complex tasks, and presenting or alerting to users only the aspects of a task or subtask that require the user's attention. The task hub user interface allows multiple users to keep track of the status of subtasks in one place, which provides an improved user experience particularly for complicated tasks. Furthermore, the task hub archives the details of completed subtasks, which can be a useful reference for completing future tasks (e.g. by recalling which contractor completed some related subtask), or for other historical purposes, such as accounting or auditing. When deployed across many users, the intelligent task hub can learn from user behavior to better manage, prioritize, and execute common subtasks, e.g., by updating its model periodically based on user actions.

Figure 6:
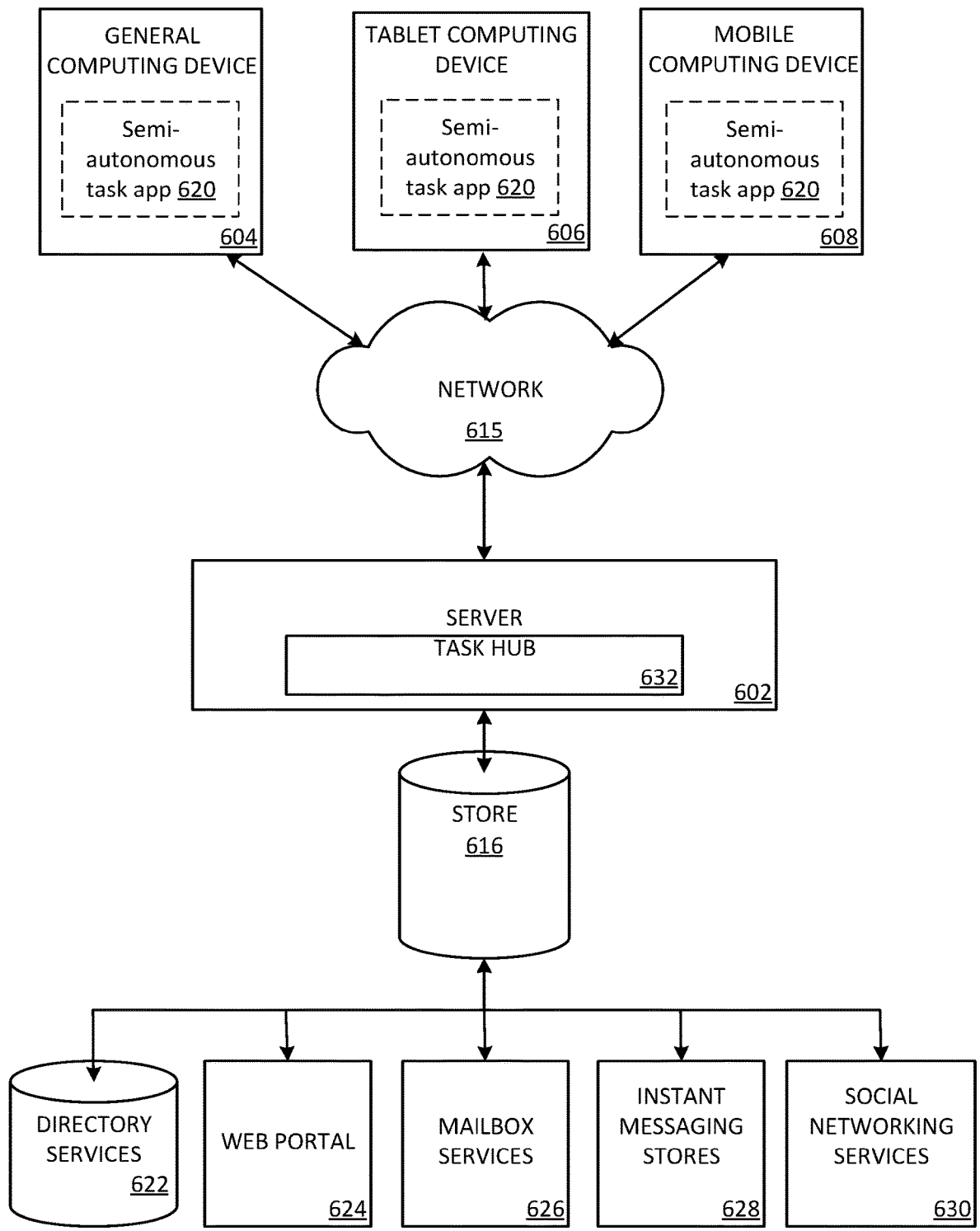
FIG. 6 illustrates one aspect of the architecture of a system for managing semi-autonomous tasks from a user device in accordance with aspects of the present disclosure.

FIG. 6 illustrates one aspect of the architecture of a system for managing semi-autonomous tasks from a user device, such as a personal computer 604, tablet computing device 606, or mobile computing device 608, as described above. Content displayed at server device 602 may be stored in different communication channels or other storage types. For example, various resources that are accessible to the task hub 632 may be stored using a directory service 622, a web portal 624, a mailbox service 626, an instant messaging store 628, or a social networking site 630. The task hub 632 may be directly accessed on the server as a web service or may be accessed through a local semi-autonomous app. 620 on the local user devices that communicates with server device 602. The server device 602 may provide data to and from a client computing device such as a personal computer 604, a tablet computing device 606 and/or a mobile computing device 608 (e.g., a smart phone) through a network 615. By way of example, the computer system described above with respect to FIGS. 1-5 may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

Figure 7:
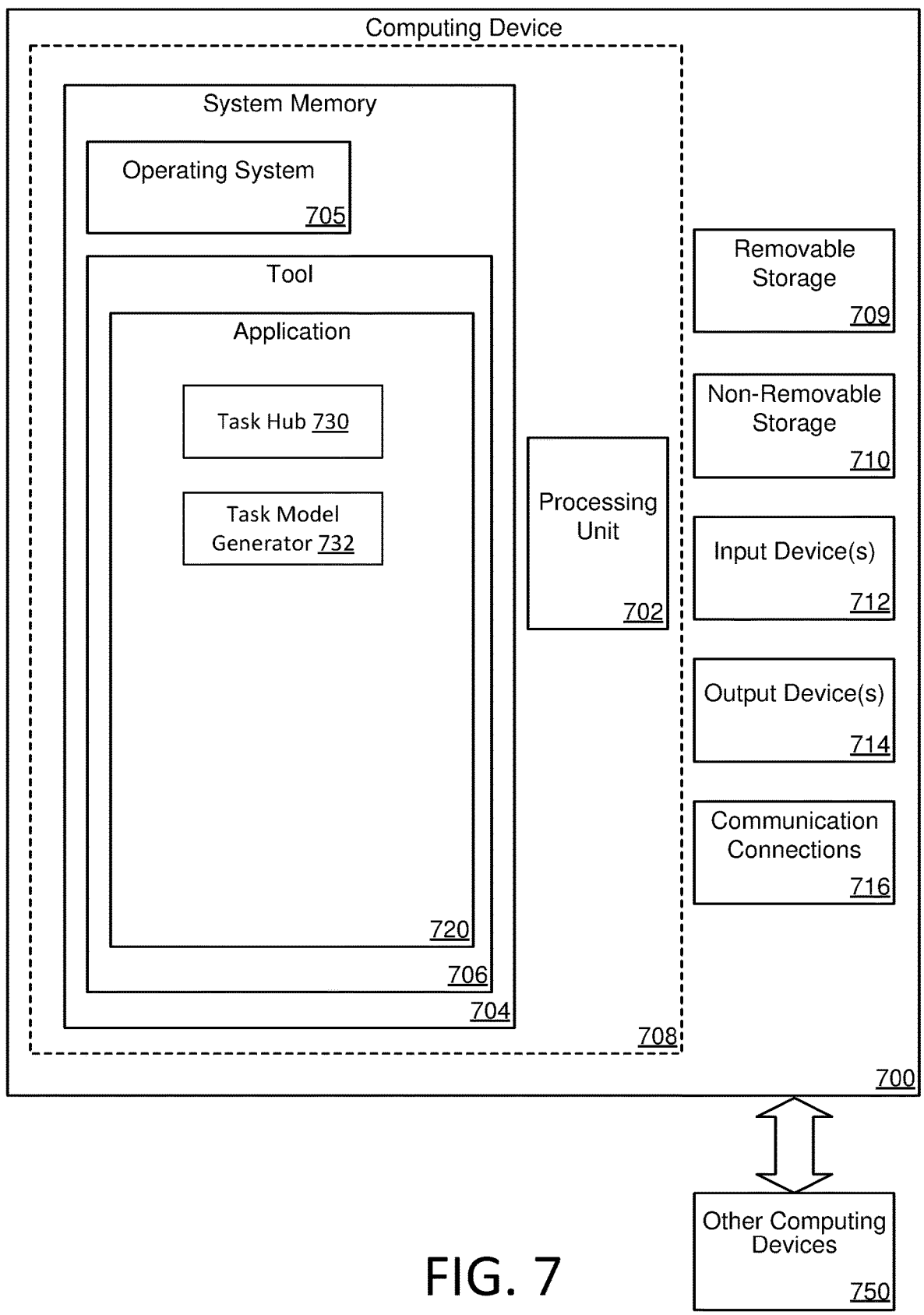
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the processing unit 702, the program tools 706 may perform processes including, but not limited to, the aspects, as described herein. The applications may include the task hub 730 and task hub model, as described in more detail with regard to FIGS. 1 and 2. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 600 may include one or more communication connections 716 allowing communications with other computing devices 1090. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
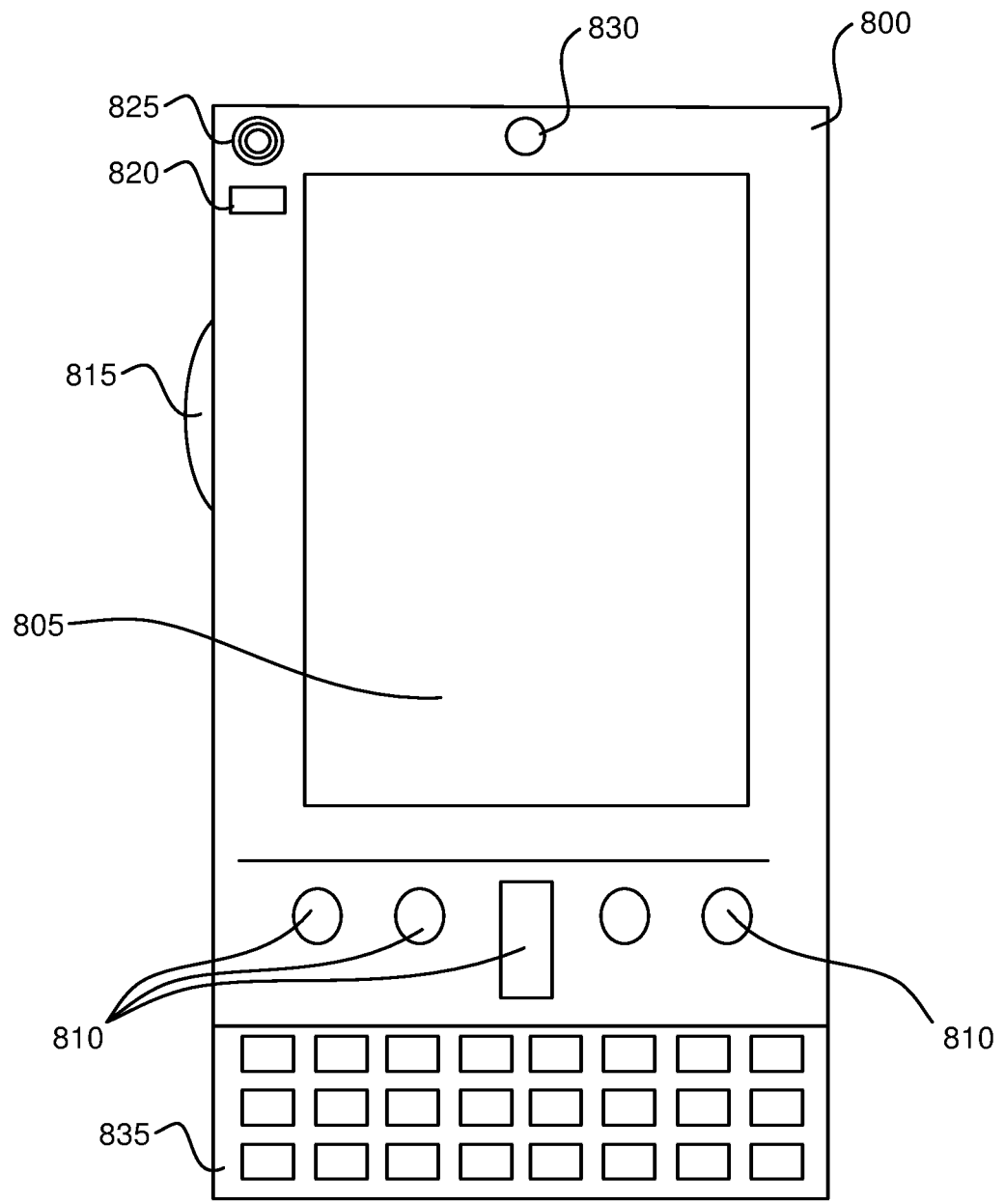
FIG. 8A is a simplified diagram of a mobile computing device with which aspects of the present disclosure may be practiced.
Figure 8B:
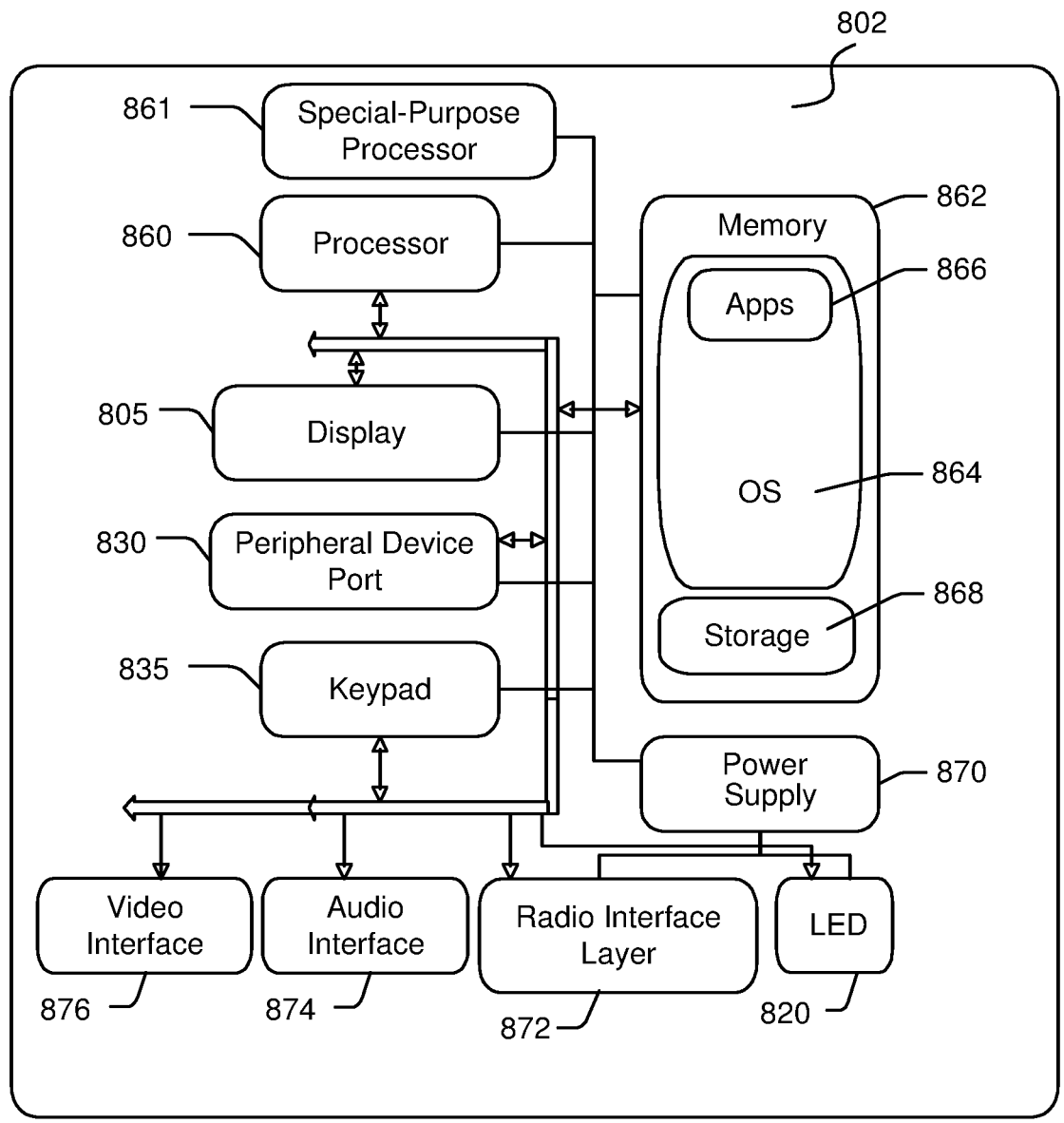
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client (e.g., computing systems 105 in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server, a mobile computing device, etc. That is, the computing device 800 can incorporate a system (e.g., an architecture) 802 to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 869 within the memory 862. The non-volatile storage area 869 may be used to store persistent information that should not be lost if the system 802 is powered down. The application programs 866 may use and store information in the non-volatile storage area 869, such as e-mail or other messages used by an e-mail application, and the like. A synchronization application (not shown) also resides on the system 802 and is programmed to interact with a corresponding synchronization application resident on a host computer to keep the information stored in the non-volatile storage area 869 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 869.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

As will be understood from the foregoing disclosure, one aspect of the technology relates to a method of semi-autonomously managing a task. The method comprises determining that the task comprises a plurality of subtasks including a first subtask and a second subtask; determining by a machine learning model that the first subtask is automatable based on a state of the plurality of subtasks and a definition for the first subtask; automatically performing the first subtask based on the determination that the first subtask is automatable; determining by the machine learning model that the second subtask requires user input based on the state of the plurality of subtasks and a definition for the second subtask; and notifying a user that the user input is needed to complete the second subtask. In an example, it is determined that the second subtask is not automatable based on an empty slot in the definition for the second subtask. In another example, it is determined that the first subtask is automatable based on satisfaction of a dependency between the first subtask and one or more of the plurality of subtasks. In another example, an order for performing the plurality of subtasks is determined by the machine learning model. In another example, it is determined by the machine learning model that a third subtask should be delegated to a third party based on the state of the plurality of subtasks and a definition of the third subtask; and the third party is notified that the third subtask has been delegated to the third party. In another example, confirmation is received from the third party that the third subtask is complete and a state of the third subtask is updated. In an example, the machine learning model is a neural network trained using task completion data. In another example, the machine learning model is one of a recurrent neural network, a transformer network, a multi-task neural network, and a bidirectional recurrent neural network. In another example, the user input is received from the user for the second subtask; a state of the second subtask is updated; and the definition of the second subtask is updated. In another example, it is determined by the neural network that the second subtask is automatable based on the updated state of the second subtask and the updated definition for the second subtask; and the second subtask is automatically performed based on the determination that the second subtask is automatable.

In another aspect, the technology relates to a system comprising: a processor; and a memory storing instructions that when executed cause the processor to: determine that the task comprises a plurality of subtasks including a first subtask and a second subtask; determine by a machine learning model that the first subtask is automatable based on a state of the plurality of subtasks and a definition for the first subtask; automatically perform the first subtask based on the determination that the first subtask is automatable; determine by the machine learning model that the second subtask requires user input based on the state of the plurality of subtasks and a definition for the second subtask; and notify a user that the user input is needed to complete the second subtask. In an example, the machine learning model is one of a recurrent neural network, a transformer network, a multi-task neural network, and a bidirectional recurrent neural network. In another example, an order to complete the plurality of subtasks is determined wherein the second subtask is scheduled to be completed before the first subtask. In another example, it is determined that the first subtask is automatable based on an empty slot in the definition for the first subtask. In another example, it is determined that the first subtask is automatable based on satisfaction of a dependency between the first subtask and one or more of the plurality of subtasks.

In another aspect, the technology relates to a computer-implemented method of semi-autonomously managing a task comprising a plurality of subtasks. The method comprises determining by a neural network that a first subtask of the plurality of subtasks is automatable based on inputs to the neural network, wherein the inputs comprise a state of the plurality of subtasks and definitions for plurality of subtasks; automatically performing the first subtask based on the determination that the first subtask is automatable; determining by the neural network that a second subtask requires user input based the inputs; and notifying a user that the user input is needed to complete the second subtask. In an example, an order of the plurality of subtasks is determined by the neural network based on the inputs. In another example, the inputs further comprise a dependency between the plurality of subtasks. In another example, a third task is delegated by the neural network to a third party based on the inputs. In another example, a resource needed to complete the second subtask is identified by the neural network.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the operations, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of semi-autonomously managing a task, the method comprising:
   determining that the task comprises a plurality of subtasks including a first subtask and a second subtask;
   determining by a machine learning model that the first subtask is automatable based on a state of the plurality of subtasks and a definition for the first subtask;
   automatically performing the first subtask based on the determination that the first subtask is automatable;
   determining by the machine learning model that the second subtask requires user input based on the state of the plurality of subtasks and a definition for the second subtask; and
   notifying a user that the user input is needed to complete the second subtask.

2. The method of claim 1 further comprising:
   determining that the second subtask is not automatable based on an empty slot in the definition for the second subtask.

3. The method of claim 1 further comprising:
   determining that the first subtask is automatable based on satisfaction of a dependency between the first subtask and one or more of the plurality of subtasks.

4. The method of claim 1 further comprising:
   determining by the machine learning model an order for performing the plurality of subtasks.

5. The method of claim 1 wherein the plurality of subtasks further comprises a third subtask and the method further comprises:
   determining by the machine learning model that the third subtask should be delegated to a third party based on the state of the plurality of subtasks and a definition of the third subtask; and
   notifying the third party that the third subtask has been delegated to the third party.

6. The method of claim 5 further comprising:
   receiving confirmation from the third party that the third subtask is complete; and
   updating a state of the third subtask.

7. The method of claim 1 wherein the machine learning model is a neural network trained using task completion data.

8. The method of claim 1 wherein the machine learning model is one of a recurrent neural network, a transformer network, a multi-task neural network, and a bidirectional recurrent neural network.

9. The method of claim 1 further comprising:
   receiving the user input from the user for the second subtask;
   updating a state of the second subtask; and
   updating the definition of the second subtask.

10. The method of claim 9 further comprising:
    determining by the neural network that the second subtask is automatable based the updated state of the second subtask and the updated definition for the second subtask; and
    automatically performing the second subtask based on the determination that the second subtask is automatable.

11. A system for semi-autonomously managing a task comprising:
    a processor;
    memory storing computer executable instructions that when executed cause the processor to:
       determine that the task comprises a plurality of subtasks including a first subtask and a second subtask;
       determine by a machine learning model that the first subtask is automatable based on a state of the plurality of subtasks and a definition for the first subtask;
       automatically perform the first subtask based on the determination that the first subtask is automatable;
       determine by the machine learning model that the second subtask requires user input based on the state of the plurality of subtasks and a definition for the second subtask; and
       notify a user that the user input is needed to complete the second subtask.

12. The system of claim 11 wherein the machine learning model is one of a recurrent neural network, a transformer network, a multi-task neural network, and a bidirectional recurrent neural network.

13. The system of claim 12 further comprising:
    determining an order to complete the plurality of subtasks wherein the second subtask is scheduled to be completed before the first subtask.

14. The system of claim 11 further comprising computer executable instructions that when executed cause the processor to:
   determine that the first subtask is automatable based on an empty slot in the definition for the first subtask.

15. The system of claim 11 further comprising computer executable instructions that when executed cause the processor to:
   determine that the first subtask is automatable based on satisfaction of a dependency between the first subtask and one or more of the plurality of subtasks.

16. A method of semi-autonomously managing a task comprising a plurality of subtasks, the method comprising:
   determining by a neural network that a first subtask of the plurality of subtasks is automatable based on inputs to the neural network, wherein the inputs comprise a state of the plurality of subtasks and definitions for plurality of subtasks;
   automatically performing the first subtask based on the determination that the first subtask is automatable;
   determining by the neural network that a second subtask requires user input based the inputs; and
   notifying a user that the user input is needed to complete the second subtask.

17. The method of claim 16 further comprising:
   determining by the neural network an order of the plurality of subtasks based on the inputs.

18. The method of claim 16 wherein the inputs further comprise a dependency between the plurality of subtasks.

19. The method of claim 16 further comprising delegating by the neural network a third task to a third party based on the inputs.

20. The method of claim 16 further comprising identifying by the neural network a resource needed to complete the second subtask.

* * * * *